(12) United States Patent
Lee

(10) Patent No.: US 8,083,174 B2
(45) Date of Patent: Dec. 27, 2011

(54) LONG MISSION TETHERED AEROSTAT AND METHOD OF ACCOMPLISHING

(75) Inventor: Yee-Chun Lee, San Jose, CA (US)

(73) Assignee: StratoComm Corporation, Albany, NY (US)

(*) Notice: Subject to any disclaimer, the term of this patent is extended or adjusted under 35 U.S.C. 154(b) by 0 days.

(21) Appl. No.: 12/662,524

(22) Filed: Apr. 21, 2010

(65) Prior Publication Data

US 2010/0264259 A1    Oct. 21, 2010

Related U.S. Application Data

(63) Continuation of application No. 11/790,899, filed on Apr. 27, 2007, now Pat. No. 7,708,222.

(51) Int. Cl.
*B64B 1/00* (2006.01)

(52) U.S. Cl. ............... 244/30; 244/24; 244/29; 244/31; 244/33

(58) Field of Classification Search .................. 244/24, 244/29, 30, 31, 33, 96, 97, 115; 340/946
See application file for complete search history.

(56) References Cited

U.S. PATENT DOCUMENTS

| | | | |
|---|---|---|---|
| 1,549,061 A | 8/1925 | Chenu | |
| 1,577,756 A | 3/1926 | Reagan | |
| 3,081,967 A | 3/1963 | Church | |
| 3,839,631 A | 10/1974 | Goddard | |
| 4,082,063 A | 4/1978 | Strickland | |
| 4,092,827 A | 6/1978 | Schneider | |
| 4,180,300 A | 12/1979 | Fort et al. | |
| 4,278,323 A | 7/1981 | Waldman | |
| 4,402,479 A | 9/1983 | Phipps, III et al. | |
| 4,438,987 A | 3/1984 | Kapaan | |
| 4,444,459 A | 4/1984 | Woodwell | |
| 4,476,576 A | 10/1984 | Wheeler et al. | |
| 4,492,427 A | 1/1985 | Lewis et al. | |
| 4,675,030 A | 6/1987 | Czarnecki et al. | |
| 4,842,221 A | 6/1989 | Beach et al. | |
| 4,958,904 A | 9/1990 | Rawski | |
| 5,090,637 A | 2/1992 | Haunschild | |
| 5,118,327 A | 6/1992 | Nelson et al. | |
| 5,674,082 A | 10/1997 | Okuhara et al. | |
| 6,182,924 B1 | 2/2001 | Nott | |
| 6,325,330 B1 | 12/2001 | Lavan, Jr. | |
| 6,360,988 B1 | 3/2002 | Monroe | |
| 6,386,480 B1 | 5/2002 | Perry et al. | |
| 6,422,506 B1 | 7/2002 | Colby | |
| 6,883,749 B2 | 4/2005 | Boschma, Jr. | |
| 7,046,934 B2 | 5/2006 | Badesha et al. | |
| 2002/0109045 A1 | 8/2002 | Beach et al. | |
| 2002/0171006 A1 | 11/2002 | Boschma, Jr. | |
| 2006/0060695 A1 | 3/2006 | Walden et al. | |

*Primary Examiner* — Tien Dinh
*Assistant Examiner* — Justin Benedik
(74) *Attorney, Agent, or Firm* — Breneman & Georges

(57) ABSTRACT

Apparatus and method for a continuous replenishing of the lift gas and maintaining the proper pressure and lift of a tethered medium altitude aerostat utilizing a novel feed tube running the entire length of the tether. A first end of the feed tube is connected to the aerostat while a second end is connected through a novel slip ring means to a pressure controlled helium ballast chamber and scrubber on the ground to maintain pressure and lift by a reversible compressing pump. A plurality of pressure and temperature sensors and tension gauges strategically placed inside and around the airship continuously monitor the temperature and pressure changes in the aerostat. A data retrieval and communication unit mounted on the aerostat collects measurement data from the pressure, temperature and tension sensors which is relayed to the ground station and the data is used to regulate lifting gas pressure inside the aerostat.

20 Claims, 9 Drawing Sheets

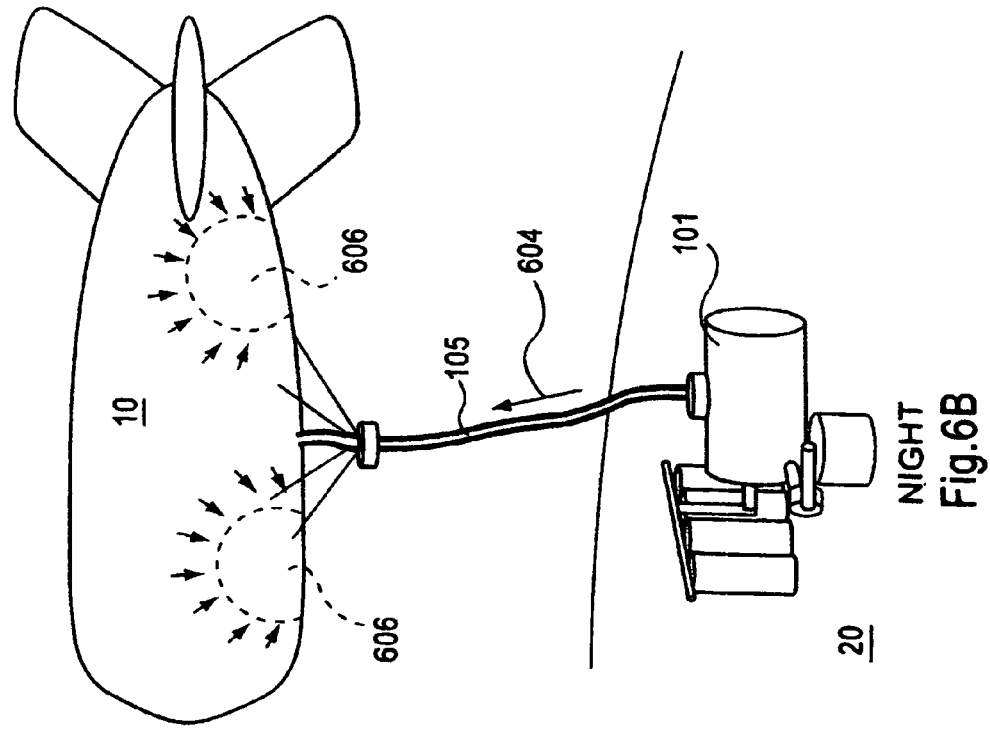
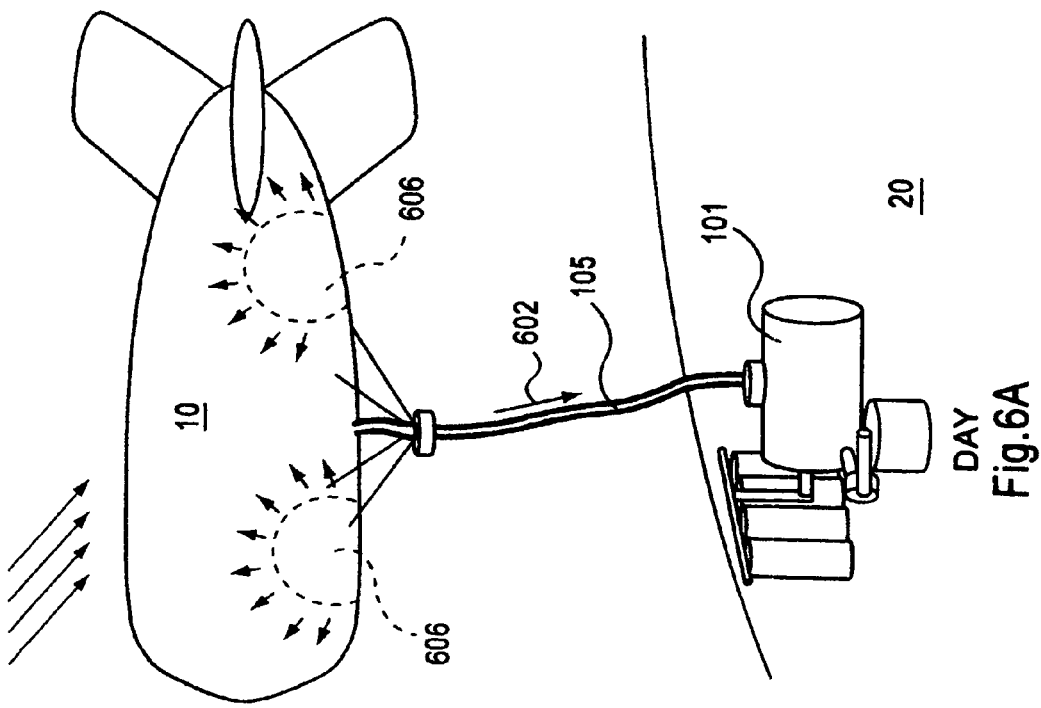

LONG MISSION TETHERED AEROSTAT AND METHOD OF ACCOMPLISHING

CROSS REFERENCE TO RELATED APPLICATIONS

The present application is a continuation application of U.S. patent application Ser. No. 11/790,899 filed Apr. 27, 2007 now U.S. Pat. No. 7,708,222 issued May 4, 2010.

STATEMENT REGARDING FEDERALLY SPONSORED RESEARCH OR DEVELOPMENT

Not applicable.

INCORPORATION-BY-REFERENCE OF MATERIAL SUBMITTED ON COMPACT DISC

Not applicable.

REFERENCE TO A "MICROFICHE APPENDIX"

Not applicable.

BACKGROUND OF THE INVENTION

1. Field of the Invention

The present invention pertains generally to the field of lighter-than-air airships. More particularly, the invention relates to the control and regulation of a lift gas such as helium along with its pressure within a tethered helium filled aerostat using a ground based lift gas ballast chamber. The invention includes a novel hollow tether with a lifting gas feed tube and novel double slip rings which allow weathervaning by providing a substantially airtight connection between the ground and the aerostat.

2. General Nature of the Prior Art

A tethered aerostat is an aerodynamic shaped, lighter-than-air vessel of a flexible structure filled with a lifting gas such as pressurized helium and mechanically anchored with a long high strength tether to a ground structure. An aerostat is equipped with a system of sensors, blowers and valves, which, in conjunction with a plurality of deformable air compartments called ballonets are used to control the pressure within the hull to maintain aerodynamic shape to minimize the drag force exerted on the airship by the ever present wind. To compensate for the diurnal and seasonal variation of ambient temperature as well as the solar gain during the daylight period, the volumes of air inside the ballonets are changed either by opening valves to allow air to be pushed out of the ballonets or by turning a blower on to blow outside air in to pressurize the ballonets to maintain pressure within the airship. The ballonets are also used to alter the aft-fore balance of the lift force in order to provide pitch control. The power needed on board the aerostat is delivered through the high voltage power cables embedded within the tether. The tether also contains one or more optical fibers to enable onboard equipment to communicate with the ground station.

3. Description of Related Art Including Information Disclosed Under 37 CFR 1.97 and 1.98

In the prior art due to inherent helium leakage and lift gas contamination due to an air infiltration, a tethered aerostat needs to be brought down periodically to refill the helium gas and to perform regular maintenance. A typical tethered blimp with a helium volume of between 50,000 cubic feet and 100,000 cubic feet can be expected to stay up for only about 10 to 20 days. The aerostat is retrieved from altitude by drawing the tether back through a mechanized winch. As the aerostat is lowered, the helium gas contracts owing to the increased ambient pressure at lower altitude. This is compensated by pumping air into the ballonets to maintain the aerodynamic shape. To launch or re-launch the aerostat, the tether is gradually released to allow the aerostat to ascend to altitude, the expanding helium gas forces air from the ballonets through the air valves. The valves are controlled to prevent the helium pressure from dropping below a threshold level.

In addition to helium leakage, there is also the issue of air infiltration which occurs at a slower rate. Since air can not provide lift, the air inside the helium bag needs to be purged periodically. This is accomplished when the aerostat is returned to earth for maintenance with a helium scrubber which removes the air from the helium. Although it is possible to include helium scrubbing equipment aloft such as described in Haunschild U.S. Pat. No. 5,090,637. However to remove the air while the airship is aloft for the purpose of extending the mission duration is highly unattractive due to the additional weight, power requirements, and complexity, hence helium scrubbing is usually done on the ground.

Haunschild U.S. Pat. No. 5,090,637 recognizes the importance of removal of oxygen, nitrogen and other gases from helium. Haunschild however does maintenance on the lift gas either in the airship or on the ground. The known prior art does not provide for the maintenance of the lift gas on the ground while the airship is deployed by providing the bidirectional transfer of the lift gas between the ground and the aerostat.

The relatively short mission duration and the significant downtime involved in retrieving and re-launching the aerostat, as well as the time it takes to replenish and clean the helium makes it unappealing to use a tethered aerostat for tasks that demand high availability such as weather monitoring and telecommunications. Frequent launch and retrieval also drastically increase the risk of damaging the envelope of the aerostat, thereby shortening the service life of the entire system.

The use of ballonet to maintain the excess pressure called super-pressure to combat the diurnal pressure fluctuation of the helium gas also produces some unwelcome side effects, the primary of which is the cyclic variation of the lift force resulting from the cyclic expansion and contraction of the helium volume. Since the aerostat is physically constrained by the tether, this leads to the cyclic variation of the tension on the tether embedded cables and optical communication fibers. Such cyclic variation progressively weakens the tether over time. In addition, the constant switching of the blower on or off also drastically shortens the service life of the blower. Malfunction of the blower can cause the aerostat to lose its pressurization resulting in damage to the aerostat by the wind aloft by a sudden increase in wind drag. Consequently, the blower needs to be maintained and/or replaced with high frequency that can be reduced by maintaining the pressure of the lift gas by a bidirectional transfer of lift gas between the airship and the ground. Furthermore, ballonets and the attendant blower equipment of the prior art increases the size, weight, and cost of the airship.

Some very low altitude tethered aerostat systems deployed at an altitude of up to 300 feet use a feed-tube that either is embedded within the tether or runs parallel to the tether to allow the refilling of the helium to be performed while the aerostat is aloft. This is accomplished by connecting the proximal end of the feed-tube to a bottle of compressed helium gas and opening the valve partially to send a burst of helium gas up the feed-tube to replenish the helium. This prior art does not provide a bidirectional flow of lift gas or do maintenance on the lift gas by scrubbing the lift gas. In addition such known prior art feed tubes which would have wall thickness sufficient to accommodate high pressure bursts of helium could not be used in airships deployed at 5,000 feet due to weight which would limit the altitude of the airship. Further the known prior art has not provided for a transfer of lift gas in a weathervaning airship through airtight slip rings.

In addition in the prior art the relatively high helium pressure used in very low altitude tethered aerostat forces the helium gas up with a flow velocity well in excess of 50 m/s for altitude of up to 300 ft. Such a high flow rate can rapidly heat up the feed-tube and could eventually damage the feed-tube if the flow rate is sustained for a long duration and damage the airtight connection of the slip ring to accommodate weathervaning.

In the prior art the feed tube has to be thick walled in order to withstand the pressure employed to force helium lift gas into the pressurized aerostat which makes the tether too heavy for higher altitude applications. Even at such a high flow rate, the refilling of the helium would still take a long time. At higher altitudes, the increased length of the feed-tube increases the flow resistance, which drastically reduces the flow speed, making manual control of the refilling process infeasible. The flow rate can be increased by opening the valve fully to increase the pressure head. However, this requires the wall of the feed-tube to be even further strengthened to enable it to resist the much higher helium pressure head. This dramatically increases the thickness of the feed-tube and since the total weight of the feed-tube is proportional to the thickness as well as the length of the tube, the concomitant increase in the weight of the feed-tube makes such a scheme impractical.

The prior art includes a variety of slip rings and flying sheaves to allow weathervaning of the airship during launch, flying or docking. Phipps III, et al. U.S. Pat. No. 4,402,479 provides slip rings for electrical cables and a flying sheave to accommodate weathervaning. Czarnecki, et al. U.S. Pat. No. 4,675,030 includes electrical equipment in the tether. Some prior art like Lavin U.S. Pat. No. 6,325,330 have conductors in the tether while other prior art like Beach et al. U.S. Pat. No. 4,842,221 has a central electrical core surrounded by a strength member. The only patent uncovered with what may be argued as a hollow tether is Schneider U.S. Pat. No. 4,092,827 which provides a duct and tether for transferring collected rain water collected from above the sea and transported to a nearby island. Schneider U.S. Pat. No. 4,092,827 does not replenish lift gas and does not include cables. None of the known prior art has a tether with a hollow core surrounded by a strength member having embedded therein electrical cables and optical telecommunications cables that have at each end novel slip rings to enable lift gas to be purified and replenished from the ground.

It would therefore be advantageous to provide a tethered aerostat system that can continuously cycle and replenish the helium gas without the airship being brought down. It would be advantageous to regulate the quality of the helium and its pressure from the ground without having to vent or dispose of lift gas when the airship is deployed at altitude.

SUMMARY OF THE INVENTION

The terms airship, aerostat and platform have been used and while the terms airship and dirigible contemplates a self propelled aircraft, the terms balloon and aerostat contemplate and aircraft lacking propulsion. The invention is applicable to blimps, balloons, dirigibles, airships as well as aerostats which are tethered. As a result hereafter the term "aerostat" or "airship" as used herein and in the claims includes all forms of tethered aircraft whether they include some self propelled mechanism or not.

The invention provides a high altitude tethered aerostat that is capable of replenishing and regulating its internal helium pressure continuously from the ground through a feed-tube that connects the helium or lift gas envelope of the aerostat to a ground reservoir without the need or significantly reducing reliance on ballonets in the airship thereby reducing the demands on blowers and pumping equipment, and methods for operating the same.

The feed-tube of the invention is sized to support a bidirectional continuous stream of helium gas at a relatively slow flow speed without excessive pumping pressure. The diameter of the feed-tube is constructed to provide just enough helium flow rate to compensate for diurnal variations and helium loss through leakage. The diameter of the feed tube is thus engineered to match the volume of lift gas in the aerostat. In an alternative embodiment the diameter of the feed tube may be chosen to provide high enough helium flow rate that is fast enough to overcome the diurnal and seasonal fluctuation of helium pressure.

A first end of the feed tube is connected in a substantially airtight fashion to the airship while a second end is connected through a dual slip ring means to a pressure controlled helium ballast chamber on the ground wherein the pressure is maintained by a reversible compressing means. A plurality of pressure, temperature sensors and tension gauges strategically placed inside and around the airship continuously monitors the temperature and pressure changes throughout the airship. A data retrieval and communication unit mounted on the airship or to a gondola collects measurement data from the pressure and temperature sensors and relay the information to the ground station, wherein the data is processed and used as a feedback signal for the control and regulation of the helium pressure inside the airship. A constantly running helium scrubber on the ground is utilized to remove the infiltrated air in the ground based helium ballast chamber.

In order to supply refurbished lift gas in a bidirectional feed line and replenish lift gas as needed a novel slip ring and tether were constructed. The novel tether includes a hollow center providing for the bidirectional flow of lift gas at a low flow rate and a low flow velocity to save weight on a tether that may be 4,000 or more feet in length. The novel tether in addition includes a strength member surrounding the hollow center and includes co-axial electrical cables and communication lines which preferably are telecom optical fibers embedded in the strength member. It will be recognized by those skilled in the art that the tether withstands a number of forces mainly vertical but also some angular forces due to the catenary form assumed by the tether in a no wind condition. The tether is also subject to rotational forces due to the weathervaning of the aerostat during launch, deployment and recovery.

These compound forces induced upon the tether must be borne primarily by the strength member and the novel slip rings utilized to absorb the rotational and some of the angular forces imposed during launch, deployment and recovery. The novel slip ring member of the invention includes a first slip ring which is substantially free to rotate while a second slip ring is held in place by an electromagnetic field generated by an electromagnetic coil. The first slip is free to rotate a number of 360 degree turns without rotating the second slip ring until a preset number of turns are exceeded at which time the second slip ring is released from the electromagnetic force generated by the electromagnetic coil and at which time the second slip ring rotates to remove tension on a coiled feed tube connecting the first slip ring to the second slip ring in a fluid tight environment or housing.

The novel slip ring member is preferably connected at both ends of the feed tube in which one end of the feed tube is connected to the airship and the other end is connected to the ground based lift gas replenishment and maintenance facility. Preferably the first slip ring also includes means for also rotatably engaging the electrical cables and the optical fiber cables included in the novel tether. Alternatively the first slip ring can include the rotational engagement of the electrical cables and the first and second slip rings and can include coiled optical cable disposed coaxially with the coiled feed cable to maintain a rotatable telecommunications link.

The novel tether novel slip rings and ground based lift gas replenishment, maintenance and purification system allows the novel airship to be deployed for longer durations than the normal around 20 day period of deployment of the prior art aerostats. The novel aerostat of the invention includes a bidirectional valving system that allows the removal of lift gas during daylight periods of heating supplemented by optional ballonets that are filled to maintain the rigidity of the airship and that allow the replenishment of refurbished lift gas at night and the deflation of the optional ballonets at night or combinations thereof as a result of temperature and pressure variations.

BRIEF DESCRIPTION OF THE DRAWINGS

The foregoing features of the invention will become more apparent from the detailed description of the invention and disclosure of the best mode in conjunction with the accompanying drawings in which:

FIGS. 6A and 6B schematically illustrate an exemplary process for regulating the helium pressure and lift force in response to diurnal changes of ambient conditions;

DETAILED DESCRIPTION OF PREFERRED EMBODIMENTS INCLUDING BEST MODE

Figure 1:
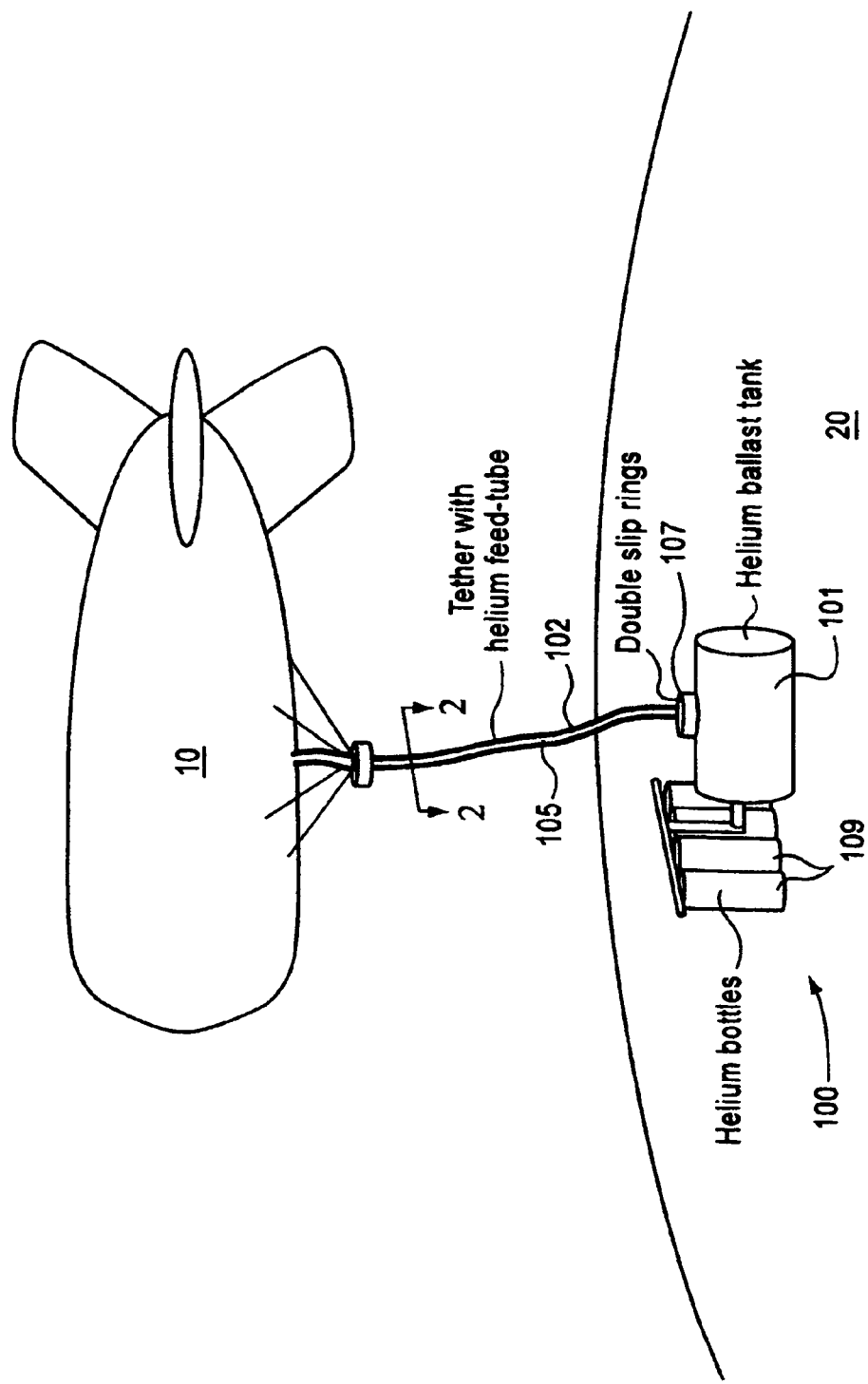
FIG. 1 is a schematic elevational view of an exemplary helium regulatory system with feed-tube and ground based helium ballast tank for a tethered aerostat.

FIGS. 1 to 4A and 4B illustrate a ground-based helium ballast system for a tethered aerostat 10 formed in accordance with one embodiment of the present invention. Referring to FIG. 1, the ground based ballast system 100 generally comprises a ground based helium ballast tank having an attendant helium storage tank 101 with optional helium storage bottles 109 disposed on the ground 20 including a feed-tube 105 which is either embedded within the tether or runs parallel to the tether 102. A double slip ring 107 allows the helium feed-tube 105 as well as the rest of the tether 102 to adapt to continuous orientation (yaw) and rotational changes of the aerostat and catenary configuration of the tether without losing its helium-tightness. The helium ballast tank 101 and the helium storage bottles 109 may be housed in a launch and retrieval vehicle, not shown, on the ground 20.

The tethered aerostat 10 is of a suitable aerodynamic shape, as shown in FIG. 1, in order to minimize wind resistance which can cause the tension of the tether to increase beyond the level needed to balance the lift force of the aerostat. The wind resistance force is directly proportional to the drag coefficient as well as being a strongly increasing function of the wind speed relative to the aerostat. The smaller the drag coefficient, the lower the wind resistance force becomes. The drag coefficient not only depends on the shape of the aerostat, but also on the stiffness of the envelope. Insufficient stiffness would result in the fluttering or wavy deformation of the skin under strong wind which would drastically increase the drag force through a complicated interaction with the boundary layer turbulence.

The skin stiffness is preferentially accomplished through the pressurization of the helium gas, a process which causes the skin to tension through slight stretching. Thus a minimum threshold for pressurization, or super-pressure, must be maintained at all times whether the aerostat is aloft, or moored. On the other hand pressurization greater than the pressure required to maintain the shape of the airship results in fatigue, stretching of the envelope and leakage of lift gas.

During daylight hours, the high solar gain causes the helium lift gas to heat up, hence an increase in the helium pressure. If the volume of the helium gas is kept the same, the increase in helium pressure, which could go as high as 70% over its nominal level, could potentially overcome the tensile stress limit of the envelope, with the consequent lost of structural integrity of the skin.

At night, the drop in ambient temperature cools the helium gas, reducing its pressure in the process. If the helium gas pressure drops below the ambient atmospheric pressure, the skin can no longer maintain its rigidity, with consequent drastic increase in wind drag which could potentially rupture the skin, or stress the tether to the point of breakage.

The conventional method of regulating pressure is to open valves connected to pressure ballonets to enable the air that resides within the ballonet to vent out into the ambient atmosphere at altitude in a controlled manner during daylight hours to allow the helium gas to expand, hence the pressure increase in controlled. At night times, the valve is again opened, and the ambient air is forced into the ballonet with a blower, pressurizing and expanding the ballonet, which in turns compresses the helium bag, thereby restoring the pressurization of the helium gas. Blowers and valve control mechanism are heavy, requiring energy to operate, and are prone to wear out or malfunction, in consequence frequent and regular maintenance is mandatory to prevent catastrophic failure of the aerostat while in operation.

The invention in contrast to the conventional prior art employs a ground based helium ballast system 100 to regulate the helium pressure by controlling the pressurization of the ballast tank 101. Referring now to FIGS. 1, 6A and 6B when the pressure difference between the proximal end and the distal end of the feed-tube 105 exceeds the natural pressure gradient under the influence of earth and gravity, the helium gas within is compelled to flow from the higher pressure end to the lower pressure end. For low to medium altitude tethered aerostat, the gravity induced helium pressure differential is considerably less than one tenth of the atmospheric pressure at the ground level; hence the effect of gravity on the helium gas is inconsequential for the present discussion.

During the daylight heating the lift gas inside the aerostat 10 expands resulting in the opening of a valve connecting the aerostat 10 to the ground based lift gas ballast tank 101. As illustrated in FIG. 6A lift gas is removed from aerostat 10 through the feed tube 105 into lift gas ballast tank 101 as represented by arrow 602 where it may be removed purified or treated as will be discussed later in greater detail. Optional ballonets 606 also may be inflated to assist in the removal of lift gas and in maintaining altitude.

At night the reverse process takes place since cooling of the aerostat 10 results in a decrease in pressure which is compensated for by pumping new or purified lift gas back to the aerostat 10 through the feed tube 105 as illustrated by arrow 604 in FIG. 6B. To assist in adding new or replenished lift gas and maintaining altitude optional ballonets 606 may be deflated.

In conventional aerostats a typical leakage rate of the helium gas at ambient pressure is about 0.02 to 0.035 cubic feet per square foot of surface area per day, which can translate into about 200 cubic feet of helium loss per day for an approximately 7,000 cubic feet aerostat. Pressurization of the helium gas raises the leakage rate in proportion to the pressure of the helium gas. Additional leakage of the helium gas through the seams and valves increases the total leakage rate slightly, but a well constructed aerostat will keep the leakage rate below 300 cubic feet per day. In addition to helium gas leakage, there is also air infiltration through the skin to contaminate the lift gas and lower the lift force of the lift gas. Since air molecules are far larger than helium molecules, the air infiltration rate is typically an order of magnitude less than the leakage rate of the helium gas. Still, the periodic scrubbing of the helium gas to remove the infiltrated air is mandatory ground maintenance in conventional aerostats to ensure that the lift force will stay above an acceptable performance level.

In accordance with the invention scrubbing of the lift gas is achieved while the aerostat is deployed through a novel tether having a feed tube of about a half inch in diameter to one and a half inch in diameter. A feed-tube of approximately half an inch in diameter can move 300 cubic feet of helium a day with a flow rate of only 1.2 meter per second (m/s). At this flow speed, the total flow resistance contributes to a pressure head of only seven percent of the atmospheric pressure, assuming the length of 5000 feet for the tether.

Figure 3:
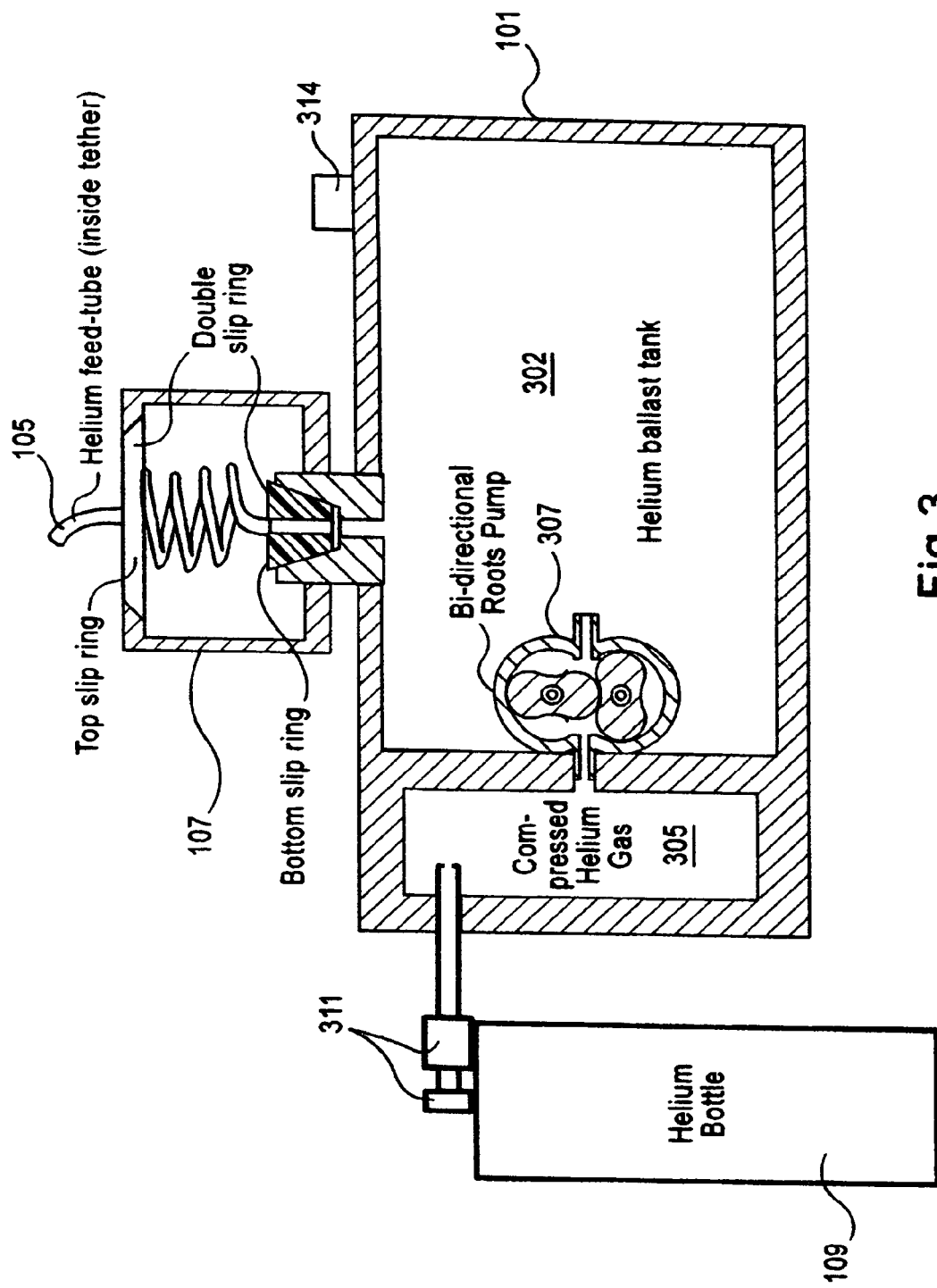
FIG. 3 is a schematic view partly in section of a ground based helium pressure ballast tank with double slip ring, bidirectional pump, and helium storage bottles.

Thus helium maintenance and replenishment can be easily accomplished with a relatively small diameter feed-tube of about 1.2 to 4.0 cm (0.5 to 1.5 inch) in diameter with a wall thickness of about 0.1 to 0.5 mm provided that the replenishment operation is performed continuously. If, for example, the helium leak is allowed to accumulate for 20 days before refilling or maintenance is performed, then the resistive pressure head could go as high as 2.7 atmospheric pressure even where the refilling takes a whole day. The best mode of the invention contemplates a continuous bidirectional transfer of lift gas assisted by the diurnal heat changes with or without supplemental pumping utilizing bidirectional pump 307 (FIG. 3).

A shorter refilling time would bring the resistance pressure head drastically higher. This arises from the fact that the flow resistance for a laminar flow in a tube is linearly proportional to the flow speed, and for turbulent flow the resistance is proportional to $3/4^{th}$ power of the flow speed. The fluid flow at low speeds is dominated by laminar flow, whereas at higher speeds the flow is mostly turbulent. Either way, the flow resistance is a rapidly increasing function of the flow speed. Since the higher the flow resistance, the higher the pressure head required to move the helium, it is therefore prudent to keep the flow velocity to a minimum while continuously moving lift gas between the aerostat 10 and the lift gas ballast tank 101 while taking advantage of the diurnal temperature differences. Intermittent replenishment of the helium gas dramatically increases the needed flow velocity; hence continuous operation is preferred over intermittent operation.

In order to compensate for diurnal helium pressure swings, the amount of helium volume that needs to be moved in either direction (from proximal to distal and vice, versa) is drastically larger. For a tethered aerostat 70,000 cubic feet in volume operating at an altitude of 5,000 feet, about as much as 20% of the helium volume, or about 14,000 cubic feet, must be cycled everyday. Proper choice of skin material and/or coating to control the emissivity/absorptivity characteristics of the hull can reduce the diurnal volume swing to less than 14% of the total volume, or about 10,000 cubic feet. This would increase the flow speed to more than 50 m/s, which would dramatically ratchet up the resistance pressure head to a level that would make the operation infeasible using a feed-tube of approximately one half inch in diameter.

This problem can be solved by increasing the diameter of the feed-tube which has the effects of simultaneously reducing the flow velocity and the drag coefficient of the feed-tube. For a given flow speed and a given material, the flow drag is a strongly decreasing function of the diameter of the feed-tube. For laminar flow, the flow resistance is inversely proportional to the square of the diameter, whereas for turbulent flow, the drag is inversely proportional to the $5/4^{th}$ power of the diameter. When the reduction of flow speed with increasing diameter is taken into account, the drag reduction factor for a given flow rate (cubic feet per second) can be shown to be inversely proportional to the 4th power of the diameter for laminar flow and $11/4^{th}$ power for turbulent flow.

Thus a doubling of the diameter of the feed-tube will decrease the flow resistance pressure head by 6.7 to 16 times. For example, if a polyurethane feed-tube is taken to have a diameter of one inch, then a maximum flow velocity of 10 m/s would be capable of moving 7,000 cubic feet of helium through the feed-tube in about 12 hours. At this speed, the flow is primarily of turbulent nature, and the resistance pressure head is 48% of the atmospheric pressure at sea level. To overcome such a pressure head requires a theoretical pump power of 384 Watts or about 4.6 kilowatt-hours in a 12 hour period. The actual pumping power requirement is about at least three times higher but still quite easily manageable. The total weight of the feed-tube composed of polyurethane would be no more than 200 kg or about 130 grams per meter.

For a one inch (inner diameter) feed tube, a maximum flow velocity of 10 m/s can displace 7700 cubic feet of helium every twelve hour, which is sufficient for regulating the helium pressure against diurnal thermal cycling in a 70,000 cubic feet aerostat tethered at 5000 feet altitude. The pipe Reynolds number is 2341, exceeding the critical Reynolds number of 2320 for pipe flow, which makes the flow of helium inside the feed tube a marginally turbulent flow. The total resistance pressure head for such a feed tube 5000 feet in length is 24600 Pascal, or about 24% of the standard atmospheric pressure, using a typical skin roughness of 1 mils.

A polyurethane feed tube provides more strength but at a disadvantage of weight for example 130 grams per meter. Where the feed tube is made of either high density polyethylene with a mass density of 0.95 gram per cubic centimeter, or polypropylene having a mass density of 0.91 gram per cubic centimeter weight can be reduced. Both can have a yield tensile strength as high as 43 mega Pascal. Assuming a safety factor of 10, the required feed tube wall thickness is 0.29 mm, or about 11 mils. A 5000 feet long feed tube would then weigh about 32 kg, or 70 lbs. This compares with roughly 1000 lbs weight of the power tether and a weight of about 0.014 pounds per foot of feed tube or about 20 grams per meter.

The prior art does not utilize a bidirectional flow or lift gas but instead employs a conventional unregulated burst feeding technique used in the low altitude tethered aerostat which results in much higher resistance pressure head for the feed tube at higher altitudes. Compressed helium usually comes in a steel cylinder which can withstand a pressure differential of 150 psi, or about 10 atmospheric pressure. Since the envelope of the aerostat cannot withstand such high pressure, a special balloon-filler valve/nozzle is often used to reduce the pressure. Still, it can be expected that the pressure of the helium emerged from such nozzle can be more than 5 atmospheres at its maximum. For the same 1 inch diameter feed tube, such pressure can push the helium gas inside the tube to slightly more than 50 m/s. At such flow rate, the 300 cubic feet daily helium loss can be replenished in a mere 6 minutes. However, the drastically larger pressure head means that the wall thickness of the feed tube has to be at least 6 mm, or 0.236 inches. At 5,000 feet, the total weight of the feed tube would be more than 660 kg, or 1,460 lbs, or about 433 grams per meter for the feed tube alone far exceeding the total weight budget typically allocated for the power tether at such altitudes or 433 grams per meter.

In contrast, if the helium maintenance operations were to be carried out intermittently, which is the way blower works, with a duty cycle of for example 0.1, then the flow velocity would be ten times higher, and the resistance pressure head would increase to 27 times the atmospheric pressure. To withstand such a pressure differential, the wall of the feed-tube would have to be thick and stout and weigh more than 3 metric tons, making it far too heavy and inflexible to be practical.

Figure 2A:
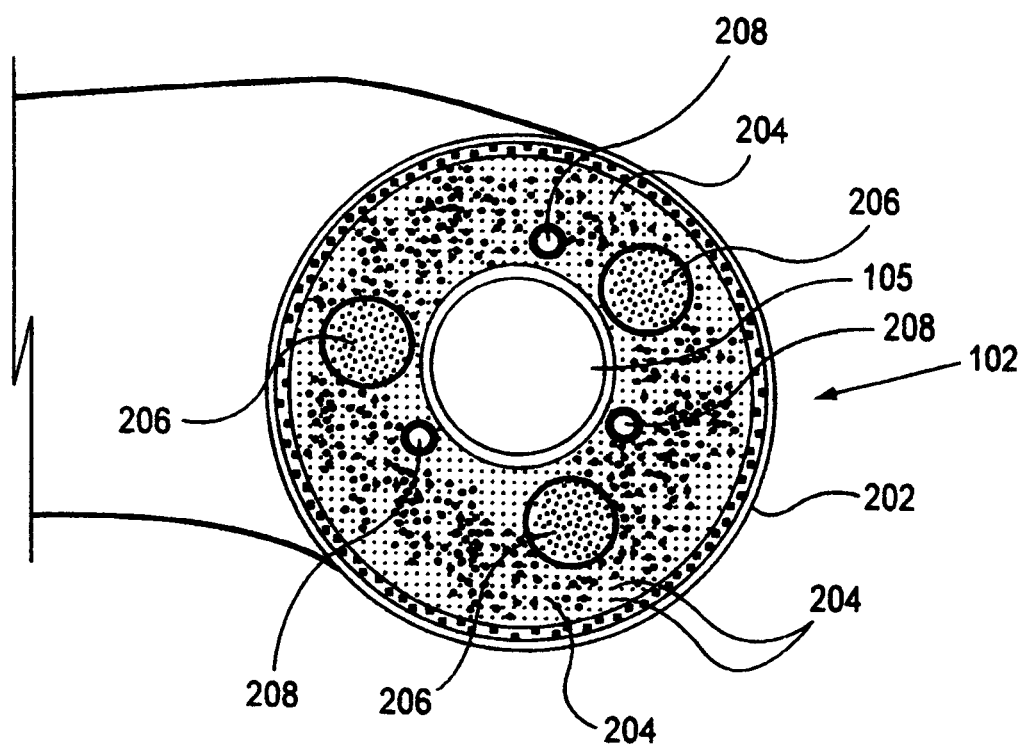
FIG. 2A is a sectional view taken along the line 2-2 of FIG. 1 of the novel tether with an embedded bidirectional helium feed-tube.

Referring now to FIG. 2A the feed-tube 105 is disposed coaxially with the tether 102 and preferably embedded within the tether assembly. The preferred embodiment of an embedded coaxial feed-tube construction is described in more detail with reference to FIG. 2A. The tether 102 generally comprises a jacket 202, a multitude of high tensile strength inorganic, organic or synthetic fibers 204 such as KEVLAR® or VETRAN® distributed throughout the interior of the tether, a plurality of high voltage insulated electrical cables 206 for the delivery of electric power to the aerostat, and one or more telecom grade optical fibers 208 for high-speed communications between the aerostat and the ground 20. Inorganic fibers such as glass or carbon may be employed or synthetic fibers such as KEVLAR® a proprietary trademark for aromatic polyamide fibers available from E.I. DuPont deNemours and Company and VETRAN® a proprietary trademark for fibers made of liquid crystal polymers available from Hoechst Celanese Corporation. A launch and retrieve vehicle may also be employed to serve as the ground station for more mobile operations. Only the high-strength fibers 204 should be under tension, all other members including the feed-tube 105 should follow a slightly helical or catenary trajectory along the longitudinal direction of the tether to ensure that they are not tensioned.

Figure 2B:
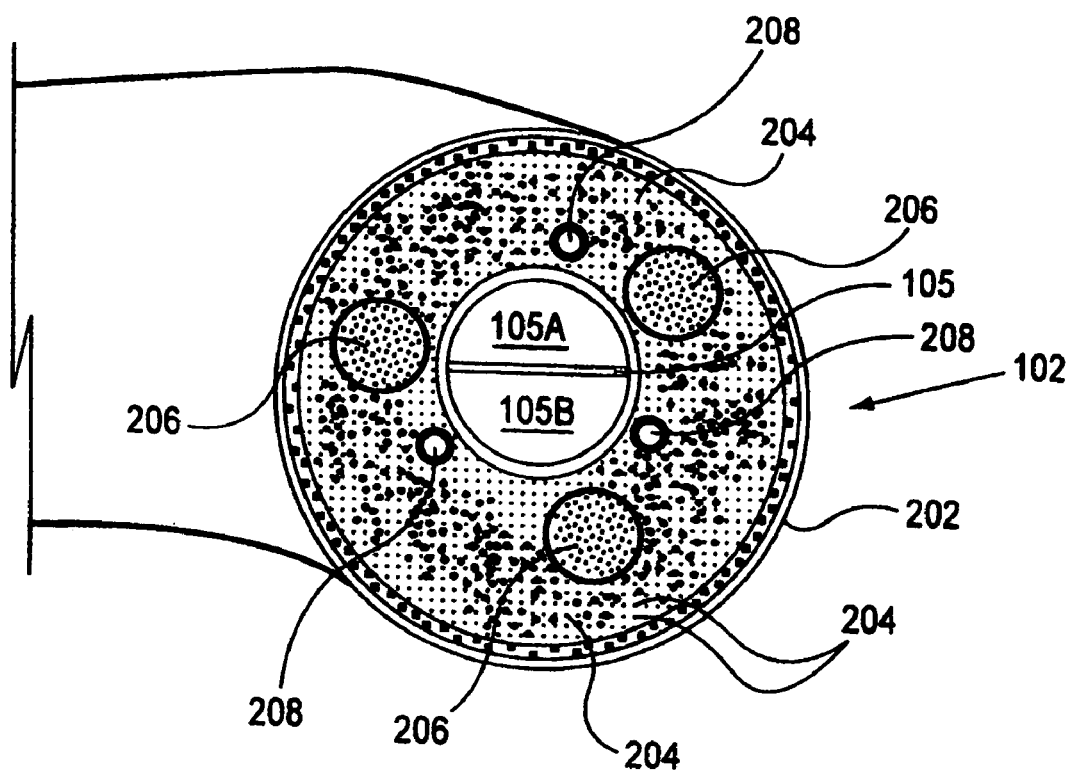
FIG. 2B is a sectional view similar to FIG. 2A of an alternative embodiment of a bidirectional lift gas feed tube having one segment for the upward flow lift gas and another segment tube for the downward flow of lift gas.

The bidirectional flow of lift gas can be accomplished utilizing a segmented or two separate feed tubes as illustrated in FIG. 2B. This alternative embodiment of the invention has advantages in providing separate upward flow path 105A and a downward flow path 105B but has the disadvantages of increasing weight and cost of fabrication. Instead of adding weight by utilizing a segmented or a plurality of feed tubes the best mode of the invention contemplates the use of a bidirectional pump in the ground based ballast cavity 302 as will be discussed hereinafter in greater detail.

The helium ballast tank 101, as illustrated in FIG. 3, is a ground based ballast chamber or large pressurized cavity 302 attached to the feed-tube 105 through a double slip ring connector 107, and is connected to a second smaller pressurized cavity 305 through a bi-directional positive displacement pump 307. The second cavity 305 is in turn connected to a plurality of high pressure helium storage tanks 109 through computer controlled valves 311.

The helium pressure within the ground based ballast cavity 302 is autonomously controlled by the bi-directional positive displacement pump 307 which pumps the helium from the second smaller pressurized cavity 305 to the ground based ballast cavity to increase the pressure of the latter and pumps the helium from the main ground based ballast cavity 302 back to the second smaller pressurized cavity 305 when a reduction of the helium pressure of the ground based ballast cavity 302 is required. To minimize the stress and power consumption of the pump 307, the helium pressure inside the second smaller pressurized cavity 305 is maintained to be approximately the same as that in the main ground based ballast cavity 302 by controlling the opening and closing of the valves 311 to admit just enough helium gas to replenish the net helium loss from the aerostat 10. The control of the valves 311 is intermittent in order to reduce the wear and tear of the valves.

A hysteresis is built into the control mechanism to prevent the incessant rapid opening and closing of the valves with a single threshold-based control mechanism. Since the helium gas leakage rate is less than 300 cubic feet a day, the valves 311 need only be opened briefly once every few days. In contrast, the pump 307 needs to be operated continuously to compensate for the diurnal changes in helium pressure of the aerostat 10. This causes the pressures inside the main ground based ballast cavity 302 and the second smaller pressurized cavity 305 to fluctuate by as much as 30% daily.

A free-rotating structure such as the aerostat 10 has to be connected to a stationary structure such as the ground or a launch and retrieve vehicle through one or more slip rings. Mechanically, the slip ring releases the stress buildup when the aerostat rotates by a multiple more than 360 degrees relative to the ground structure. The slip ring also enables the electric cables inside the tether assembly to maintain electrical contact with the ground power supply. In accordance with the invention the helium feed-tube 105 also must be connected to the ground helium ballast 101 in a gas tight fashion to minimize helium gas leak. This object is impossible to achieve with the prior art slip ring arrangement for airships since such an arrangement invariably requires a sliding gas seal.

A sliding seal has to satisfy two conflicting objects; i.e. the high gas sealing capability and the ease of rotation. To ensure high gas sealing performance, the seal must be pressed against the rotating structure with a large force to keep the gap between the rotary sleeve and the stationary sleeve to a minimum, but this would unavoidably increase the friction between the rotary sleeve and the stationary sleeve to the point of making any relative rotational movement difficult.

Any lessening of the contact pressure between the rotary element and the stationary element would drastically increase the helium leakage.

Figure 4A:
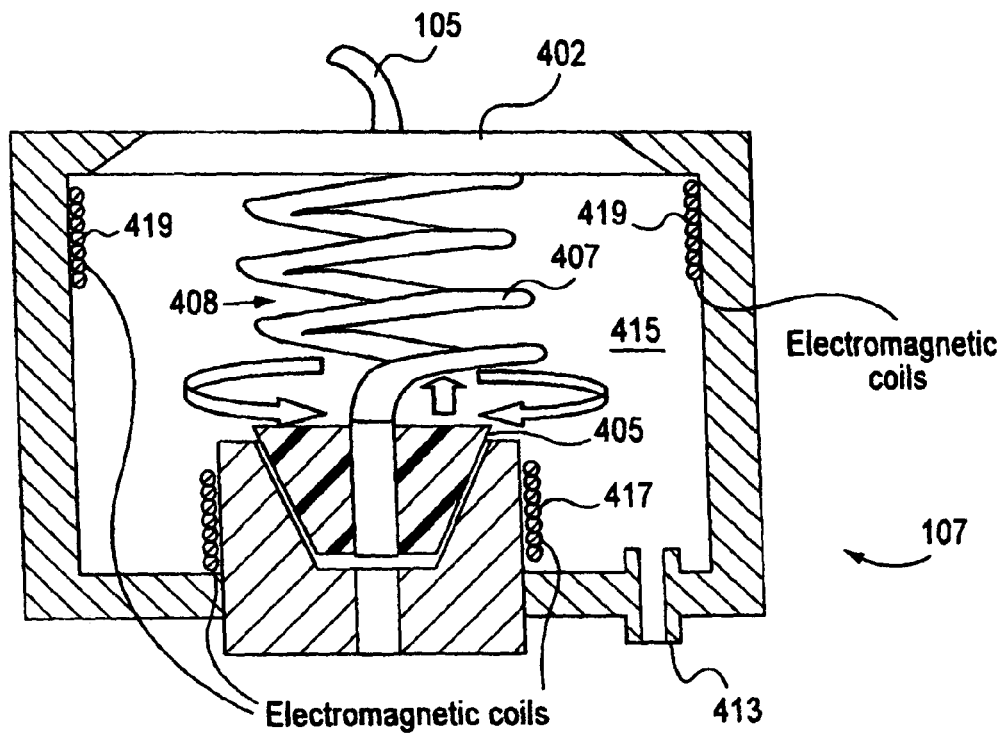
FIGS. 4A and 4B are schematic side elevational sectional views of how the double slip ring adjusts to the change of the orientation of the aerostat or tether while maintaining a tight seal to prevent helium or lift gas leakage through the slip ring.
Figure 4B:
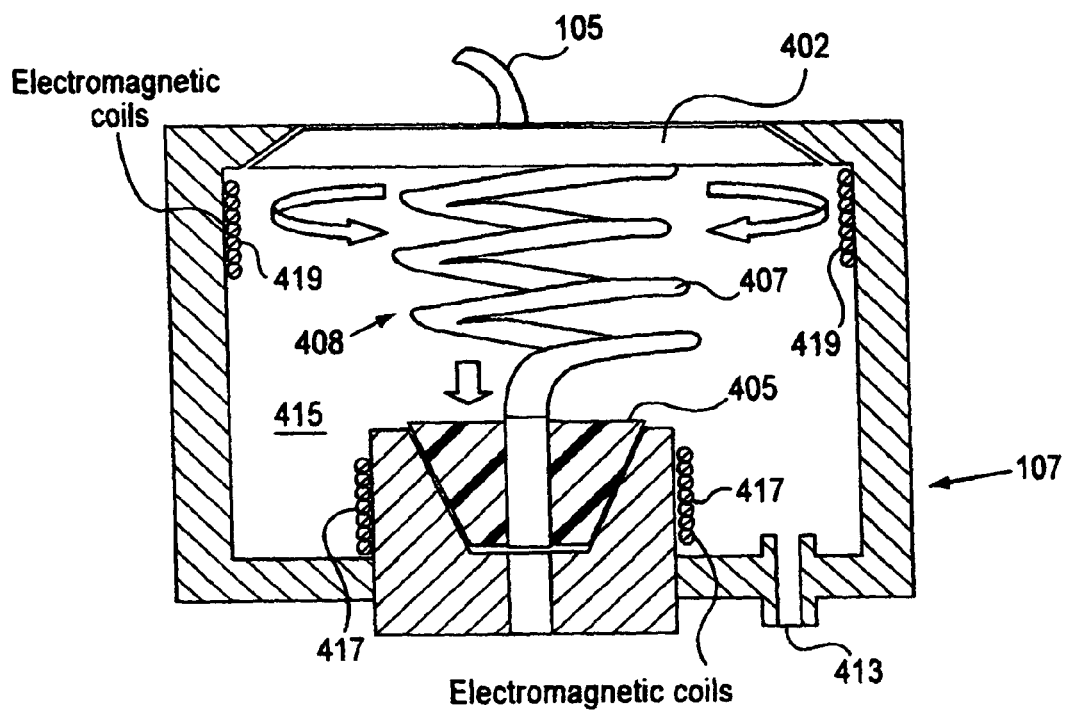

This problem has been solved in accordance with the invention by employing a double slip ring as illustrated in FIGS. 4A and 4B. The double slip ring 107 includes a first slip ring 402 and a second slip ring 405, interconnected by a flexible connecting tube 407 in the shape of a flexible coil 408 with a plurality of turns. Both slip rings 402 and 405 are made of a ferromagnetic alloy which exhibits a strong permanent magnetic field, and are housed inside a low pressure chamber 415. Normally, the first slip ring 402 is allowed to freely rotate FIG. 4B with a portion of feed tube 105 while turning is absorbed by coil 408 and while maintaining a modest gas sealing performance while the second slip ring 405 is kept stationary by a strong electromagnetic field generated by a first electromagnetic coil 417. The high contact pressure produced by the electromagnetic force ensures that the second slip ring 405 can provide a tight seal for the helium. The flexible coil structure of the connecting tube 407 allows the first slip ring 402 to rotate by multiple 360 degree turns without rotating the second slip ring 405.

When a preset maximum number of turns is exceeded, the first slip ring 402 is momentarily kept stationary with a second electromagnet 419 to provide a tight helium seal FIG. 4B, and the second slip ring 405 is released from the electromagnetic force generated by the first electromagnet 417 and is rotated by exactly the same number of turns quickly to remove the tension built up on the connecting tube 407 and return flexible coil 408 to its previous configuration. Any helium leakage from the second slip ring 405 during the brief rotation is recovered through a suction pump (not shown) that is connected to the opening 413 to the low pressure chamber 415. Since the first slip ring 402 inevitably admits ambient air to infiltrate, the low pressure chamber 415 contains a mixture of helium and air, hence a scrubber is used to remove the infiltrated air before the helium is fed back into the second smaller pressurized cavity 305.

The helium pressure regulation for diurnal temperature compensation requires the movement of helium in both directions. During the daytime the aerostat helium temperature increases owing to solar heat gain, and the ground based helium ballast tank 101 must lower its helium pressure to allow helium gas to move from the aerostat 10 to the large pressurized cavity 302. A portion of the infiltrated air in the aerostat will also be moved from the aerostat 10 to the ground based regulated ballast cavity 302.

This makes it possible to do maintenance on the helium lift gas and scrub the infiltrated air from the helium gas on the ground without the need to take the aerostat down. Assume, by way of example, a typical air infiltration rate of 50 cubic feet per day, given that $1/7^{th}$ of the helium volume in the aerostat 10 is cycled everyday, the entire helium volume will be replaced every 7 days. It thus follows that with a continuous scrubbing operation, a steady state is achieved when the infiltrated air is approximately 350 cubic feet in volume. This can be deduced from the fact that when the air is less than 350 cubic feet in volume, the air removed through scrubbing per day will be less than 50 cubic feet; hence the air volume will continue to grow. Likewise, when the infiltrated air is more than 350 cubic feet in volume, the air removed daily by scrubbing will be more than 50 cubic feet per day, which exceeds the air infiltration rate, and thus the air volume will decrease.

Figure 5:
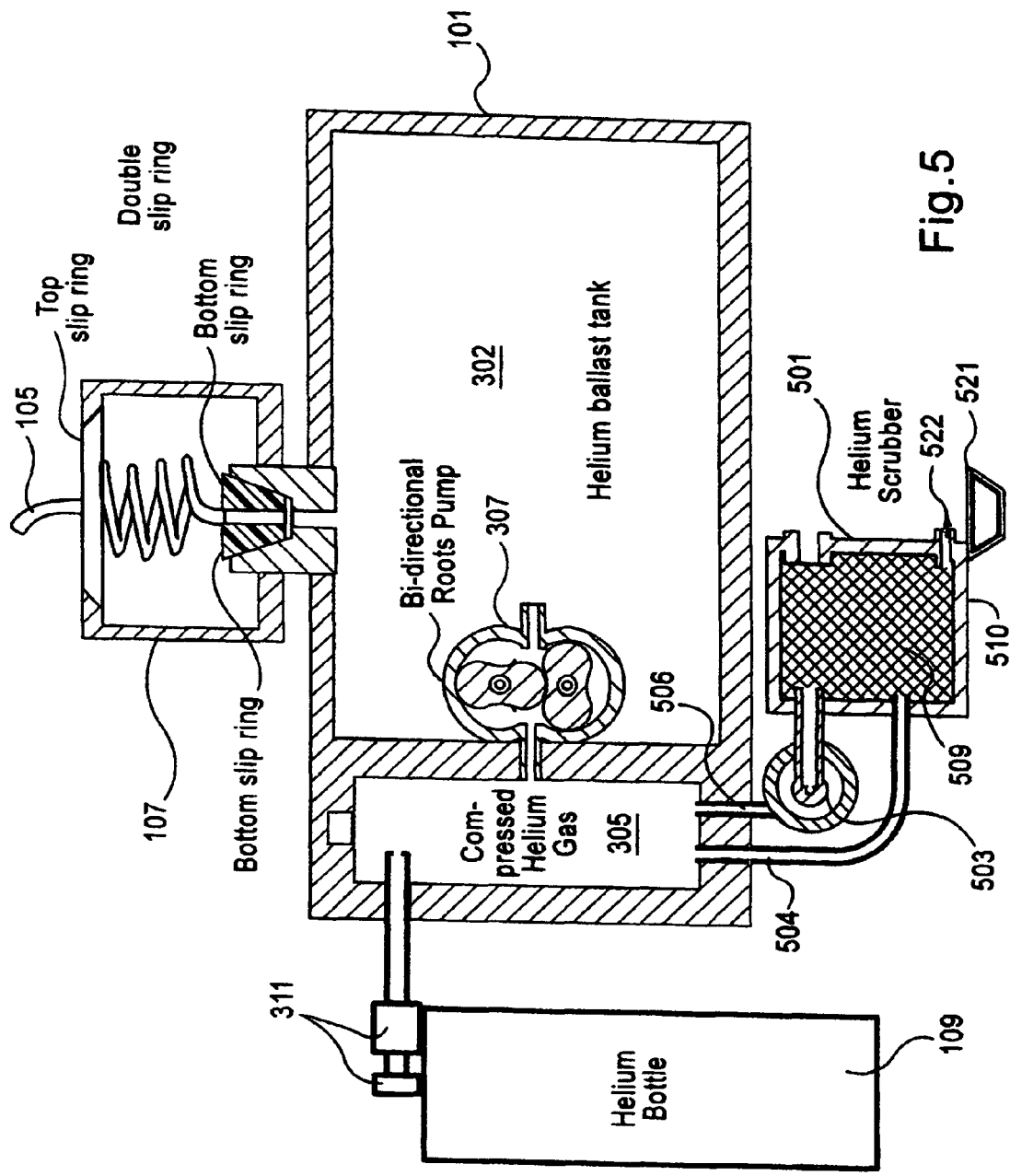
FIG. 5 is a schematic view partly in section illustrating an alternative embodiment of a ground based helium ballast tank with a helium scrubber.

FIG. 5 illustrates the maintenance of the helium lift gas on the ground while the airship is deployed at altitude wherein the inlet 504 of the helium scrubber 501 is connected through a compressor to the smaller pressurized cavity 305 and its outlet 506 is also connected to the smaller pressurized cavity 305. The compressor 503 continuously draws helium-air mixture from the smaller pressurized cavity 305 and sends the compressed mixture through the semi-permeable membrane 509 inside the scrubber chamber 510 to separate the air from the helium. The separated air is released to the atmosphere, and the pure helium gas is returned to the smaller pressurized cavity 305. The compression also increases the dew point inside the chamber 510, wherein the moisture contained in the mixture is condensed and is bled to water drainage 521 through a bleed valve 522 periodically.

The dehumidified helium gas can help prevent frosting when it is returned to the airship deployed at altitude since frosting is a dangerous condition when the temperature of the aerostat skin drops below freezing point. Frosting on the skin can make the portion of the skin coated with a thin layer of ice brittle by creating high stress points under external load. Frosting only occurs when the inside of the airship skin is coated with condensate before the skin temperature drops below freezing point. With the lower moisture content, condensation cannot take place inside the aerostat. The outside skin can still collect condensate if the ambient temperature drops below dew point. This is unlikely to happen since a prevalent wind at altitude prevents condensate from accumulating on the skin. On the rare occasion of a windless night, the air is usually dry since the wind generally receives its energy from the latent heat contained in moisture. It would also be possible to preheat the helium gas inside the ballast chamber 302 at night to maintain a slightly elevated skin temperature above the ambient temperature to prevent condensation.

The regulation of helium pressure against diurnal temperature swing has the benefit of minimizing the cycling of skin surface tension which can drastically reduce the service life of the skin. This is because a large fluctuation of skin tension can accelerate the fatiguing of the skin material through creep, a gradual irreversible deformation of the envelope that results from repeated application of mechanical stress. With advanced feedback control, it is possible to maintain nearly a constant helium pressure irrespective of the ambient conditions. Although this would minimize the cycling of the pressure induced stress, it would also lead to a diurnal swing of the total lift force on the aerostat 10. This is owing to the fact that when the helium temperature is low, particularly at night, more helium is needed in order to achieve the same gas pressure. This would make the aerostat heavier because of the added helium mass, as illustrated in FIG. 6B. The small molecular weight of the helium lessens the diurnal swing of the lift force to less than 3% of the total lift force. A further reduction of the lift force fluctuation can be realized if a second, smaller feed-tube connects each of the ballonets 606 and is used to regulate the air pressure inside the ballonets 606. By removing the same mass of air from the ballonets as the mass of the helium added to the aerostat, the total mass of the aerostat stays constant; hence the total lift can remain unchanged through diurnal variations.

Figure 7:
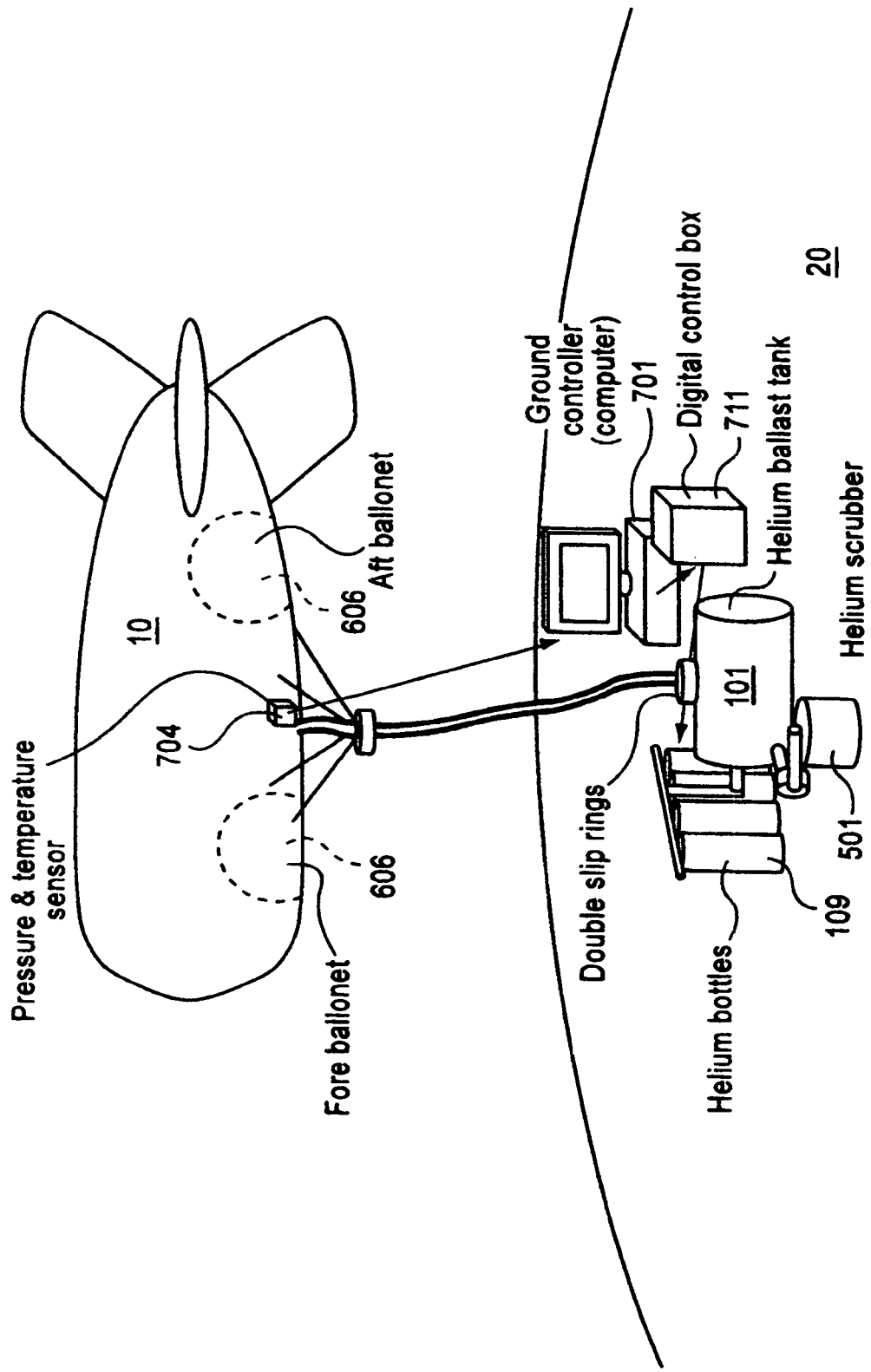
FIG. 7 schematically illustrates an exemplary best mode system with onboard temperature, pressure, and force sensors, fiber optic link, and ground control center.

Referring now to FIGS. 3 and 7 to efficiently regulate helium pressure in the aerostat, a computer 701 on the ground is used to control the pump 307 (FIG. 3) in ballast tank 101. Valves 311 and pressure sensor 314 (FIG. 3) are utilized together with pressure and temperature sensor 704 to monitor the helium pressure and temperature inside the aerostat 10 as well as the skin and ambient air temperatures and the temperature and pressures inside the ballast chamber 302 and smaller pressurized cavity 305 as inputs to a control program in order to control the speed and direction of operation of the helium bidirectional positive displacement pump 307 and the time and duration of the opening of the valves 311 in order to provide optimal regulation of the helium and gas pressures and also possibly the heating of the lift gas in aerostat 10 to control the lift force.

The pressure and temperature monitoring is provided by an array of onboard pressure and temperature sensors 704. These sensors 704 constantly relay environmental data to the computer 701 through one of the optical fibers 208 (FIG. 2) embedded inside the tether 102, as shown in FIG. 2. Similar sensors (not shown) are embedded inside the ballast chamber 302 and smaller pressurized cavity 305, and inside the helium scrubber 501 and the helium storage bottles 103. The data collected by those earth bound sensors are sent to the control computer 701 through a local area network (not shown).

After the sensor data is processed by the computer program, the computer 701 sends control parameters to a digital controller 711 which converts binary data into control voltages and/or currents to drive the helium bidirectional positive displacement pump 307, open and close valves 311, and the compressor 503 that provides compressed helium gas to the scrubber 501. The control program could be PDI (principle-differential-integral) based, or could be model based predictive/feedback control program, or any other mathematical feedback control algorithm that can provide stable, accurate control. Of these, the model-based control is believed to be the best mode because it is based on a mathematical model of the physical processes that govern the pressure variations of the individual subsystems such as the aerostat 10 and the ballast system 100 (FIG. 1).

Figure 8:
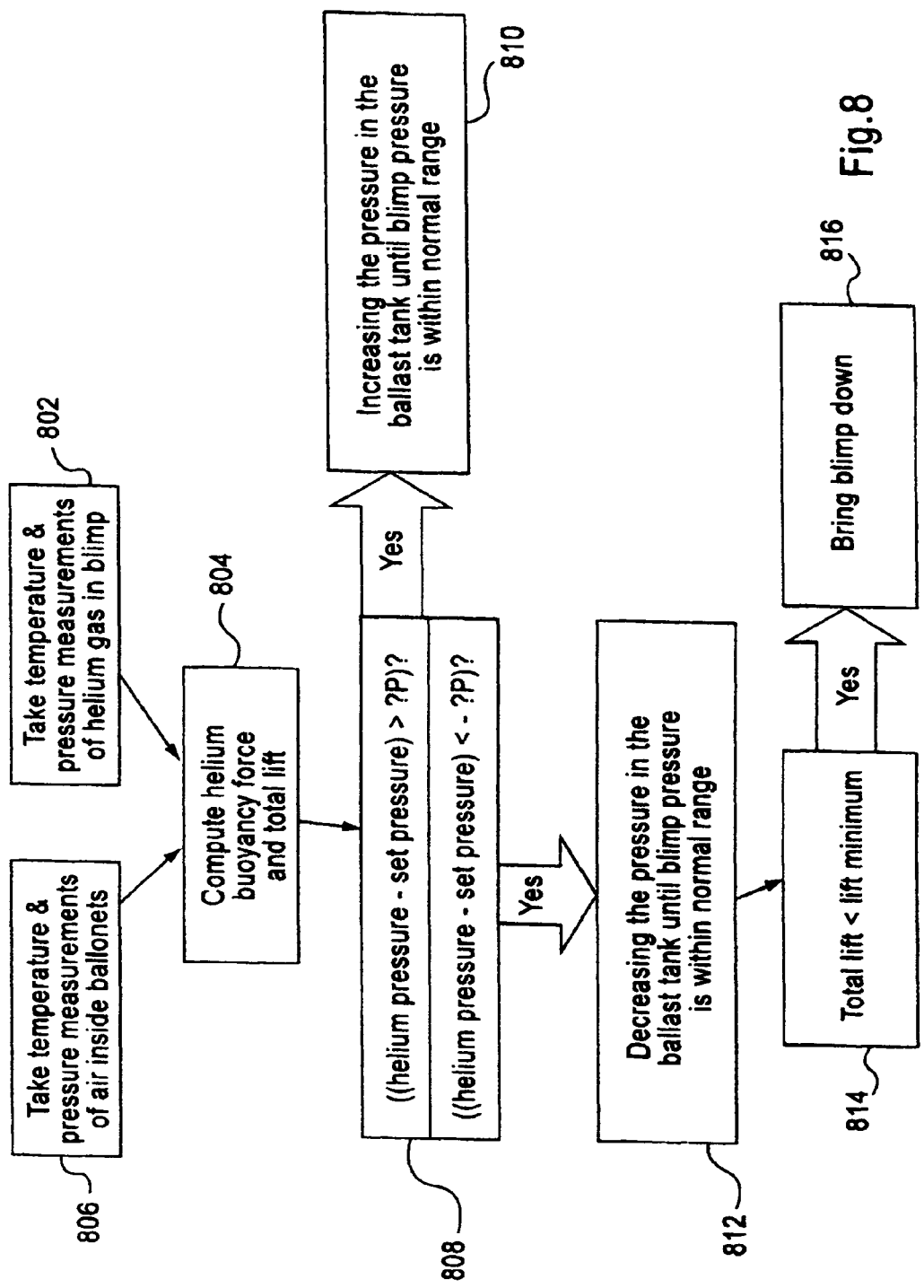
FIG. 8 is a flow chart of an exemplary procedure for operation of the helium replenishment and pressure regulation system of a novel aerostat.

A flow chart of the ballasting program is shown in FIG. 8. FIG. 8 also illustrates the best mode of the invention in which pressure and temperature sensors 704 (FIG. 7) provide data as represented by block 802 to a computer 701 to compute helium buoyancy force and total lift as represented by block 804. An optional temperature and pressure sensor is provided for ballonets 606 which also provides data as represented by block 806 to computer 701 which is used in calculating buoyancy force and total lift as illustrated in block 804 to take into account differences in diurnal variations.

Once buoyancy requirements are calculated the actual helium pressure is compared with the calculated pressure as represented by block 808. If the calculated helium pressure is greater than the actual set pressure, pressure in ballast tank 101 is increased until the pressure in the aerostat is within the normal range as indicated by block 810. On the other hand if the actual helium pressure is greater than the calculated pressure, pressure in ballast tank 101 is reduced to the normal range as represented by block 812.

In the event the total lift is less than the lift minimum as represented by block 814, the aerostat is brought down for maintenance as represented by block 816.

The method of the invention and flow chart can include sensors in the helium ballast tank 101 and in the helium bottles 109 (FIG. 9) to sample and compare the purity of the helium lift gas as well as the humidity of the lift gas in making calculations as to lift, temperature and pressure in the aerostat 10 and well as in the helium ballast tank in monitoring the efficiency of the helium scrubbers as well as providing information as to the quality of the lift gas received from the aerostat as well as the quality of the lift gas supplied to the aerostat.

The novel aerostat as supported by the novel tether and slip rings can be operational for extended periods of time without having to be brought down for service thanks to the continuous replenishment, purification, and dehumidification of the helium gas and the minimal use of the ballonet valves and the absence of prior art blowers. However, it may eventually be necessary to retrieve the aerostat for repair or because of bad weather, or to update the sensors or communication payloads. In order to move a substantial percentage of the helium gas from the aerostat to the ballast tank within a reasonable time of one or two hours that it requires to recover the aerostat would mandate a further increase of the diameter of the feed-tube. Similar consideration applies to the launch of the aerostat.

It will be recognized the invention is capable of numerous changes and modifications by those skilled in the art. The airship may be equipped with lightweight engines to assist in launch recovery or deployment and the lift gas may be modified to employ mixtures of lift gasses and the arrangement of the components in the tether may be modified as well as the organization of the components of the slip rings to accommodate the rotational contact of the optical fibers and electrical cables as well as the way in which control signals are sent to and processed on the ground and in the aerostat. These and such other variations are intended to be included in the scope of the appended claims.

As used herein and in the following claims, the word 'comprising' or 'comprises' is used in its technical sense to mean the enumerated elements include but do not exclude additional elements which may or may not be specifically included in the dependent claims. It will be understood such additions, whether or not included in the dependent claims, are modifications that both can be made within the scope of the invention. It will be appreciated by those skilled in the art that a wide range of changes and modification can be made to the invention without departing from the spirit and scope of the invention as defined in the following claims:

What is claimed is:

1. A slip ring for accommodating a tethered weathervaning aerostat comprising:
    (a) a housing having a first end and a second end;
    (b) a first rotatable element disposed in said first end of said housing;
    (c) a second rotatable element disposed in said second end of said housing;
    (d) a flexible coiled tubing connecting said first rotatable element to said second rotatable element;
    (e) an electromagnetic coil to maintain said second rotatable element stationary with respect to said first rotatable element until a predetermined number of revolutions of said first rotatable element is exceeded, and;
    (f) a hollow tether connected to the aerostat.

2. The slip ring of claim 1 further comprising a second electromagnetic coil to reduce the rotatability of said first rotatable element.

3. The slip ring of claim 2 wherein said housing is substantially airtight.

4. The slip ring of claim 3 wherein the housing includes a port for recovering a gas leaked inside said housing.

5. The slip ring of claim 3 wherein said first rotatable plate includes a tapered perimeter.

6. The slip ring of claim 1 wherein said second rotatable element is of a frustro conical configuration.

7. The slip ring of claim 6 wherein said housing includes a mating frustro conical opening for said second rotatable element.

8. The slip ring of claim 7 wherein said electromagnetic coil is disposed around the outside of said mating frustro conical opening.

9. The slip ring of claim 1 wherein said hollow tether is connected to the tethered aerostat with a ground based lift gas ballast tank and wherein said slip ring is disposed intermediate said tethered aerostat and said ground based lift gas ballast tank.

10. A double slip ring for accommodating a weathervaning aerostat comprising:
   (a) a housing having a first end and a second end;
   (b) a first rotatable gas self sealing slip ring disposed in said first end of said housing;
   (c) a first sliding seal disposed between said first rotatable gas self sealing slip ring and said first end of said housing;
   (d) a second rotatable gas self sealing slip ring disposed in said second end of said housing; and
   (e) a second sliding seal disposed between said second rotatable gas self sealing slip ring and said second end of said housing, and;
   (f) the aerostat connected to said first or second rotatable gas shelf sealing slip ring.

11. The double slip ring of claim 10 further comprising a flexible conduit connecting said first rotatable gas self sealing slip ring with said second rotatable gas self sealing slip ring.

12. The double slip ring of claim 11 further comprising an electromagnetic coil for maintaining said first rotatable gas self sealing slip ring stationary to said second rotatable gas self sealing slip ring for a predetermined number of revolutions.

13. The double slip ring of claim 12 wherein said predetermined number of revolutions depends upon the flexibility of said flexible conduit.

14. The double slip ring of claim 13 wherein the flexibility of said flexible conduit is increased by employing a flexible coiled conduit.

15. The double slip ring of claim 12 further comprising a second electromagnetic coil.

16. The double slip ring of claim 10 further comprising an electromagnetic coil connected to said first rotatable gas self sealing slip ring or said second rotatable gas self sealing slip ring.

17. The double slip ring of claim 10 wherein said first rotatable self sealing slip ring and said second rotatable self sealing slip ring are of a frustro conical configuration.

18. A double slip ring apparatus comprising:
   (a) a housing having a first end and a second end;
   (b) a first cylindrical shaped closure having an opening and a tapered perimeter rotatably secured to said first end of said housing;
   (c) a second cylindrical shaped closure having an opening and a tapered perimeter rotatably secured to said second end of said housing;
   (d) a flexible conduit connecting said opening in said first cylindrical shaped closure with said opening in said second cylindrical shaped closure; and
   (e) a friction device for maintaining said first cylindrical shaped closure or said second cylindrical shaped closure stationary with respect to the other for a predetermined number of revolutions, the double slip ring apparatus accommodating a tethered weathervaning aerostat, and;
   (f) a hollow tether connected to the aerostat.

19. The double slip ring apparatus of claim 18 wherein said housing is substantially air tight.

20. The double slip ring apparatus of claim 19 wherein said housing includes a port for recovering a gas leaked inside said substantially air tight housing.

* * * * *